United States Patent
Minamikawa

(10) Patent No.: US 7,967,049 B2
(45) Date of Patent: Jun. 28, 2011

(54) TAPE EXFOLIATION APPARATUS AND TAPE-AFFIXING APPARATUS

(75) Inventor: Masahito Minamikawa, Nissin (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 665 days.

(21) Appl. No.: 11/789,699

(22) Filed: Apr. 24, 2007

(65) Prior Publication Data

US 2007/0281120 A1    Dec. 6, 2007

(30) Foreign Application Priority Data

Apr. 26, 2006  (JP) ................................. 2006-122498

(51) Int. Cl.
*B65H 29/54* (2006.01)
(52) U.S. Cl. ........ 156/584; 156/344; 156/579; 156/494; 156/230; 156/540; 428/40.1; 428/41.8
(58) Field of Classification Search .................. 156/344, 156/584, 579, 523, 361, 574, 552, 494, 286, 156/230, 238, 256, 295, 517, 521, 538, 540, 156/DIG. 37; 428/40.1, 41.8
See application file for complete search history.

(56) References Cited

U.S. PATENT DOCUMENTS

| 4,541,886 | A | * | 9/1985 | Marlow et al. | ................. | 156/230 |
| 4,822,445 | A | * | 4/1989 | Yamaguchi | .................... | 156/510 |
| 2004/0157027 | A1 | * | 8/2004 | Doomernik | .................. | 428/40.1 |

FOREIGN PATENT DOCUMENTS

JP    5-56860 U    7/1993

OTHER PUBLICATIONS

Considered Mar. 31, 2011, Notice of Grounds for Rejection (JP) mailed Jun. 22, 2010, issued in corresponding Japanese Application No. 2006-122498, filed Apr. 26, 2006 (5 pages).

* cited by examiner

*Primary Examiner* — Khanh Nguyen
*Assistant Examiner* — Keith T Aziz
(74) *Attorney, Agent, or Firm* — Christensen O'Connor Johnson Kindness PLLC

(57) ABSTRACT

An apparatus for automatically peeling a removal tape from a removal-tape-attached adhesive tape and affixing the adhesive tape to a battery module. A removal-tape-attached adhesive insulation tape supplied from an uncoiler is held in a folded state by means of a carrier plate. The carrier plate reciprocates between a first position and a second position. When the carrier plate has moved from the first position to the second position, a tape holding unit holds the tape by means of suction. Subsequently, as a result of movement of the carrier plate from the second position to the first position, the removal tape is peeled from the removal-tape-attached adhesive insulation tape T, thereby uncovering an adhesive surface of the adhesive tape. The battery module is dropped toward the adhesive tape at an inclination with reference to the vertical direction, whereby the adhesive tape is affixed to the battery module.

9 Claims, 4 Drawing Sheets

TAPE EXFOLIATION APPARATUS AND TAPE-AFFIXING APPARATUS

PRIORITY INFORMATION

This application claims priority to Japanese Patent Application No. 2006-122498 filed on Apr. 26, 2006, which is incorporated herein by reference in its entirety.

BACKGROUND OF THE INVENTION

1. Technical Field

The present invention relates to a technique for automatically peeling a removal tape from a peel-off tape and affixing an adhesive tape to a battery module or the like.

2. Related Art

Conventionally, at the time of covering of a battery module, or the like, an adhesive insulation tape with a removal tape (or backing paper) is fed from a roller. The removal tape is peeled off from the adhesive insulation tape by means of pulling the removal tape, to thus uncover an adhesive plane of the adhesive insulation tape and cover the battery module with the adhesive insulation tape.

5-193813 A describes a technique intended for sequentially feeding a cut tape of a predetermined length, from which a removal tape has been removed, to a location to which a tape is to be affixed. As shown in FIG. 7, a tape T consecutively fed from a tape supply section 1 is fed to a predetermined length while being nipped by a tape carrier 7 which reciprocates at a given stroke L along a guide rail 5. A removal tape "t" undergoes suction exerted through a recovery hose, whereby the removal tape is peeled from the tape T fed through the tape carrier 7. A tape portion from which the removal tape "t" has been peeled is cut by a tape-cutting mechanism 19. These operations are sequentially repeated, whereby a cut tape T' of a fixed length not having the removal tape "t" is sequentially supplied.

However, in the configuration for peeling the removal tape by means of suction exerted through the recovery hose, the position of the adhesive tape varies and fails to become stable during peeling operation, which poses a problem of a decrease in the accuracy of an affixing position. Moreover, there arises a problem of occurrence of wrinkles in an adhesive tape during the peeling operation or the like.

SUMMARY

The present invention provides an apparatus which enables reliable peeling of a removal tape from a removal-tape-attached adhesive tape and highly-accurate affixing of the adhesive tape on a substance subject to adhesion, such as a battery module or the like.

The present invention provides a tape exfoliation apparatus for peeling a removal tape from a removal-tape-attached adhesive tape, comprising:

a supply section for supplying the removal-tape-attached adhesive tape;

a carrier plate which moves from a first position to a second position while holding the removal-tape-attached adhesive tape in a folded manner such that the removal tape comes inside and which subsequently moves from the second position to the first position; and a holding section for holding an adhesive tape side of the removal-tape-attached adhesive tape at the second position, wherein the carrier plate is moved from the second position to the first position while the removal-tape-attached adhesive tape is being held by the holding section, thereby peeling the removal tape.

In one embodiment of the present invention, a tapered surface is formed along an edge of the carrier plate which is to contact a folded portion of the removal-tape-attached adhesive tape, and a peeling angle is adjusted by a tapered angle of the tapered surface. Moreover, when moving from the second position to the first position, the carrier plate moves while the edge contacts a surface of the removal-tape-attached adhesive tape at a predetermined angle of inclination.

The present invention also provides a tape-affixing apparatus, comprising:

a supply section for supplying a removal-tape-attached adhesive tape;

a carrier plate which moves from a first position to a second position while holding the removal-tape-attached adhesive tape in a folded manner such that the removal tape comes inside and which subsequently moves from the second position to the first position; and a holding section for holding an adhesive tape side of the removal-tape-attached adhesive tape at the second position, wherein the holding section is formed from two stages spaced from each other by an amount of predetermined clearance;

the carrier plate is moved from the second position to the first position while the removal-tape-attached adhesive tape is being held by the holding section, thereby peeling the removal tape and holding the adhesive tape in a spanned manner over the predetermined clearance; and the adhesive tape is caused to adhere to a substance subject to adhesion by means of inserting the substance into the predetermined clearance from an adhesive surface side of the adhesive tape.

In one embodiment of the present invention, the substance subject to adhesion is inserted into the predetermined clearance at a predetermined angle of inclination with reference to a vertical direction. Although the substance subject to adhesion is arbitrary, the substance is, for example, a battery module.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following figures, wherein.

DETAILED DESCRIPTION

An embodiment of the present invention will be described hereunder by reference to the drawings.

Figure 1:
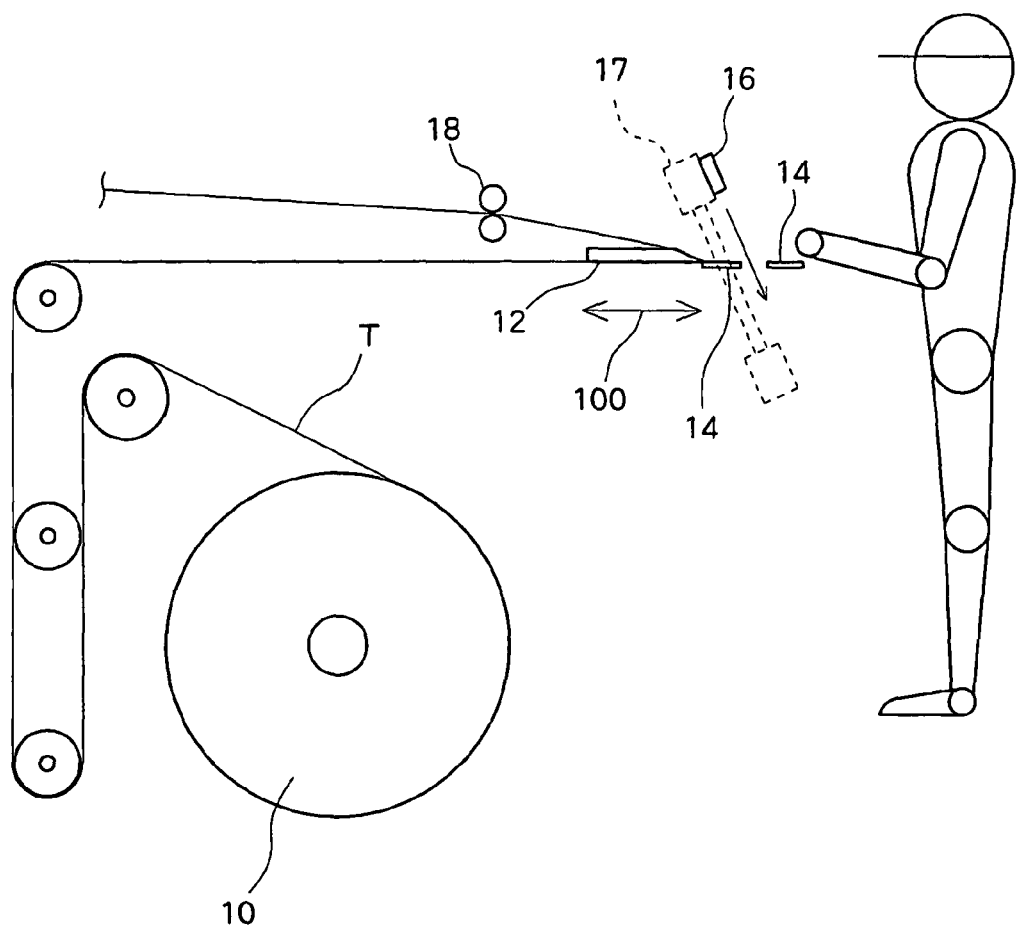
FIG. 1 is an overall structural view of a tape-affixing apparatus of an embodiment of the present invention.

FIG. 1 shows the configuration of a tape-affixing apparatus of the present embodiment. The present embodiment is an example case where the surface of a battery module, such as a nickel-metal hydride battery, or the like, is covered with an insulation tape. The tape-affixing apparatus broadly comprises a tape supply section for supplying a removal-tape-attached adhesive insulation tape; a peeling section for peeling a removal tape from the removal-tape-attached tape; and a bonding section for bonding to a battery module the adhesive insulation tape whose adhesive surface has become uncovered as a result of peeling of the removal tape.

The tape supply section is formed from an uncoiler 10 for feeding a removal-tape-attached adhesive insulation tape T (hereinafter referred to simply as "tape T") and some feed motors. The tape T is a tape where a removal tape is affixed to an adhesive surface of the adhesive insulation tape. The tape is fed to the peeling section in an essentially horizontal direction by means of a feeding mechanism in such a way that a removal tape surface serving as backing paper is situated at an elevated position in the drawing.

The peeling section comprises a carrier plate 12, a tape holding unit 14, and brake rollers 18. The carrier plate 12 reciprocates between a first position (position "a") and a second position (position "b") in arrowed direction 100 in the drawing; namely, a horizontal direction corresponding to a direction in which the tape T is fed. The carrier plate 12 assumes the shape of a flat plate whose width is equal to or greater than the width of the tape T, and a tapered surface is formed at an extremity of the carrier plate. The tape T is held in a folded manner by means of this tapered surface. The tape T originating from the supply section passes below the carrier plate 12, and is folded by the extremity of the carrier plate 12 such that the removal tape surface comes to the inside. The tape runs over an upper portion of the carrier plate 12 toward the brake rollers 18, and is taken up by an unillustrated coiler. The tape holding unit 14 is formed from two tape-holding stages which are separated from each other by a predetermined clearance, and each of the tape-holding stages subjects the tape to downward suction, thereby retaining the tape on the stage. The tape holding unit 14 performs holding operation in synchronism with reciprocation of the carrier plate 12. Specifically, the carrier plate 12 moves rightward within the horizontal direction while holding the tape T in a folded state. When the extremity of the carrier plate 12 has reached position "b," the tape T undergoes suction, to thus be retained at position "b." Position "b" is present rightward with reference to the clearance between the two tape-holding stages, and the tape T is held to span over the clearance as a result of movement of the carrier plate 12 from position "a" to position "b." After having held the tape T at position "b," the carrier plate 12 reversely moves from position "b" to position "a." As a result of movement of the carrier plate 12 from position "b" to position "a," the removal tape is peeled off from the tape T, and only the adhesive insulation tape is held by the tape holding unit 14.

The adhesive section includes a transporting mechanism 17 which transports or drops a battery module 16 serving as a substance subject to adhesion to or into the clearance of the tape holding stage along a predetermined direction. The adhesive insulation tape is held so as to span over the clearance, and the adhesive insulation tape is caused to adhere to, in a covering manner, the surface of the battery module 16 by transporting or dropping the battery module 16 into the clearance. In the present embodiment, the battery module 16 is transported or dropped at a predetermined angle of inclination with reference to the vertical direction rather than being transported or dropped in the vertical direction as illustrated.

Figure 2:
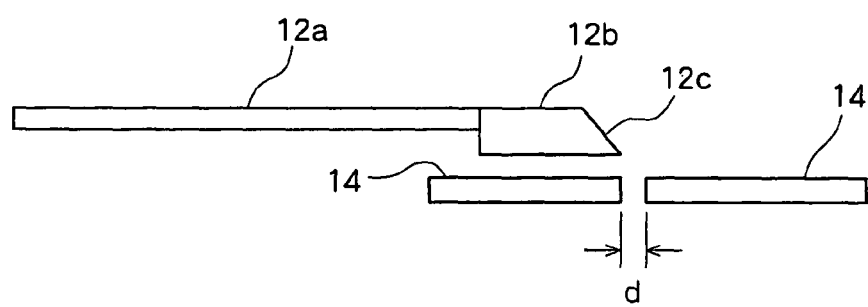
FIG. 2 is an enlarged view of a carrier plate shown in FIG. 1.

FIG. 2 shows an enlarged view of the carrier plate 12 and the tape holding unit 14 which are shown in FIG. 1. The carrier plate 12 is made up of a peeling carrier 12a and a peeling-angle adjustment fin 12b. A tapered surface is formed along the extremity of the peeling-angle adjustment fin 12b, and a tapered angle of this tapered surface corresponds to an angle at which the removal tape is peeled. For example, the tapered angle δ ranges from 45 degrees to 60 degrees. The tape holding unit 14 is formed from the two tape holding stages which are separated from each other by space "d" along a tape-feeding surface. The clearance "d" is set to at least a length which enables inclined passage of the battery module 16 serving as a substance subject to adhesion. Each of the stages is connected to, e.g., a pump, and a non-adhesive surface side of the tape T is held in a sucked manner by suction force of the pumps. The clearance "d" between the stages may also be made adjustable as required. Each of the stages may perform intermittent suction when attracting the tape T. Namely, once the tape has undergone suction, suction may be stopped or eased, and suction may be performed again. Wrinkles having occurred in the tape T can be eliminated by means of such intermittent suction.

The tape-affixing apparatus of the present embodiment has a configuration, such as that mentioned above, and will be described hereunder in terms of a step of peeling a removal tape and a step of affixing the tape to the battery module 16.

<Step of Peeling the Removal Tape>

Figure 3A:
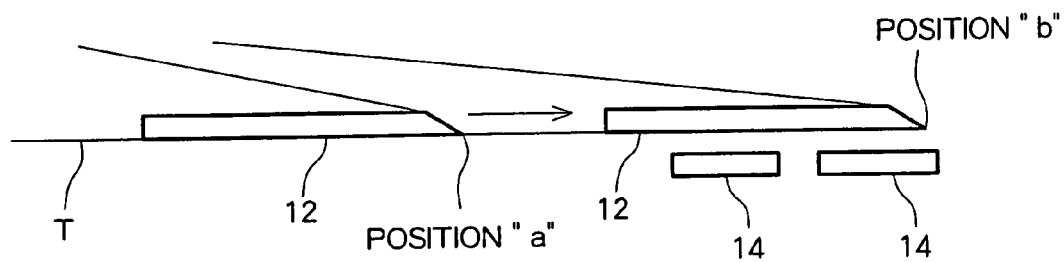
FIG. 3A is a descriptive view showing movement of the carrier plate from position "a" to position "b"
Figure 3B:
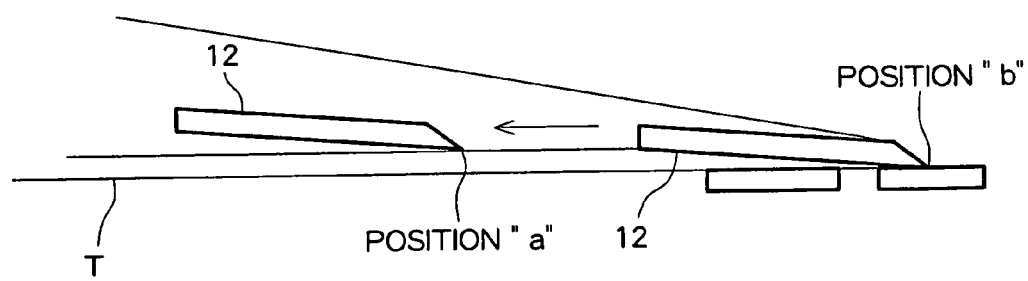
FIG. 3B is a descriptive view showing movement of the carrier plate from position "b" to position "a"

FIGS. 3A and 3B show reciprocation of the carrier plate 12 between position "a" and position "b." FIG. 3A shows movement of the carrier plate 12 from the position "a" to the position "b." The carrier plate 12 moves from position "a" to position "b" while the tape T is held in a folded manner by the peeling-angle adjustment fin 12b provided at the extremity. Position "a" is located leftward of the tape holding unit 14, and position "b," is situated on the right stage of the two stages constituting the tape holding unit 14. The carrier plate 12 moves from position "a" to position "b" in parallel to a tape surface of the tape T. When the carrier plate 12 has reached position "b," the tape holding unit 14 starts suction of the tape T pursuant to a command from a processor which controls the entirety of the tape-affixing apparatus in an integrated manner.

Figure 4:
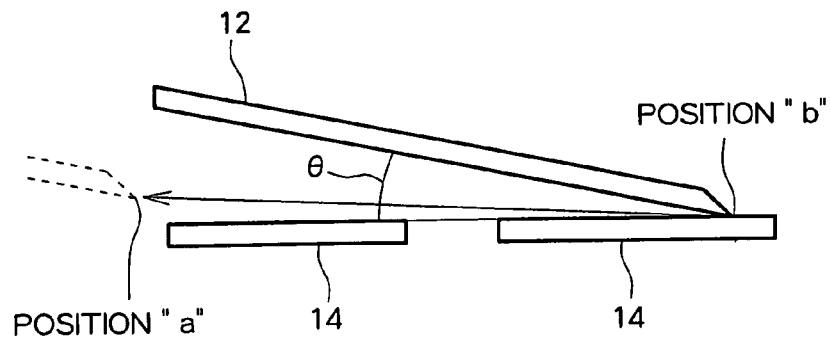
FIG. 4 is a descriptive view showing inclination of the carrier plate achieved when moved from position "b" to position "a"

FIG. 3B shows movement of the carrier plate 12 from position "b" to position "a." The carrier plate 12 moves, while remaining inclined at a predetermined angle with respect to the tape surface, from position "b" to position "a" in such a way that only the edge of the extremity of the peeling-angle adjustment fin 12b contacts the tape. The adhesive insulation tape surface is held by the tape holding unit 14, and the removal tape surface is pulled by a recoiler or the like. Hence, the removal tape is peeled off from the tape T in association with movement of the carrier plate 12 from position "b" to position "a," whereupon only the adhesive insulation tape is held on the tape holding unit 14. A distance between position "a" and position "b" is constant, and only a predetermined length of the adhesive insulation tape is held by the tape holding unit 14. Since the carrier plate 12 moves in an inclined state such that only the edge of the extremity of the carrier plate contacts the tape surface as mentioned above, wrinkles or air bubbles can be eliminated even when having arisen. The adhesive insulation tape from which the removal tape has been peeled off is cut at position "a" by means of the tape cutting mechanism. FIG. 4 shows inclination of the carrier plate 12 achieved when the carrier plate 12 is moved from position "b" to position "a." The carrier plate 12 contacts, by means of only the edge of the extremity thereof, the tape T. The adhesive insulation tape is held on the tape holding unit 14, whereas the removal tape is retained by the carrier plate 12 and then taken up by the recoiler. The angle θ of inclination of the carrier plate 12 is set to, e.g., 5 degrees to 15 degrees or thereabouts.

The carrier plate 12 may also be inclined at θ even when the tape T is fed to position "b" as a result of movement of the carrier plate 12 from position "a" to position "b" as well as when the removal tape is peeled as a result of the carrier plate 12 moving from position "b" to position "a." Specifically, the carrier plate 12 may also be inclined at all times during a period of time when the carrier plate 12 reciprocates between position "a" and position "b." Although being basically constant, the inclination angle θ of the carrier plate 12 may also be changed between the time of forward movement and the time of backward movement, as necessary.

<Step of Affixing the Tape to the Battery Module 16>

After the removal tape has been peeled off and the adhesive insulation tape has been retained by means of the tape holding unit 14, the battery module 16 is transported or dropped toward the adhesive insulation tape from a position located above the adhesive insulation tape. At this time, the battery module 16 is transported or dropped in an inclined manner rather than in the vertical direction.

Figure 5A:
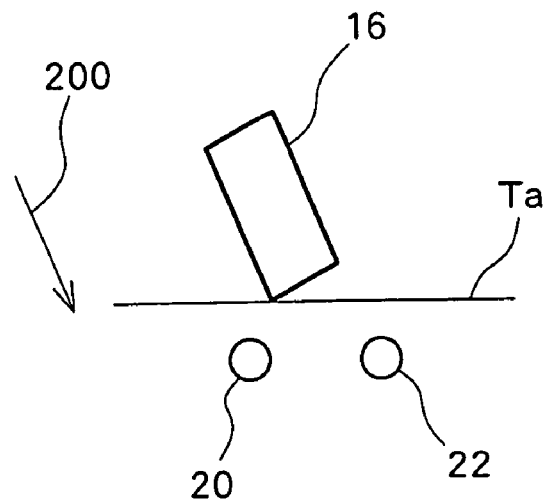
FIG. 5A is a descriptive view pertaining to affixing of a tape to a battery module (Part 1)
Figure 5B:
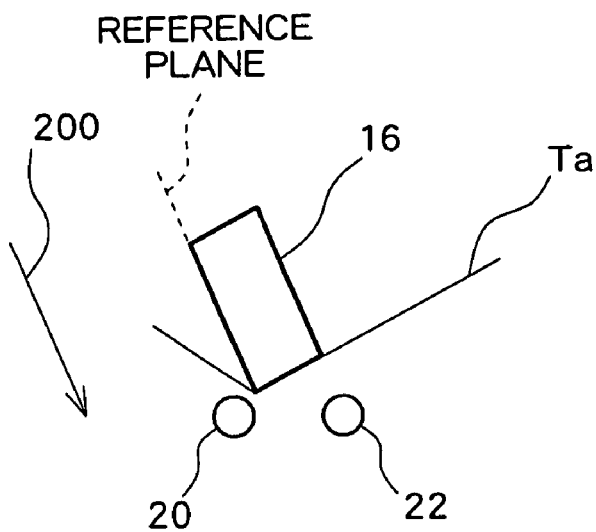
FIG. 5B is a descriptive view pertaining to affixing of the tape to the battery module (Part 2)
Figure 5C:
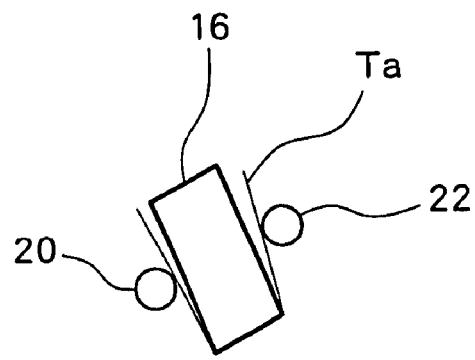
FIG. 5C is a descriptive view pertaining to affixing of the tape to the battery module (Part 3)

FIGS. 5A to 5C show a method of affixing the tape to the battery module 16. The tape holding unit 14 holds an adhesive insulation tape Ta (hereinafter simply called a "tape Ta") from which a removal tape has been peeled, and the battery module 16 is dropped in an inclined direction from the adhesive surface side of the tape Ta. A first roller 20 and a second roller 22 are provided below the tape Ta; namely, the tape holding unit 14. Although the position of the first roller 20 is stationary, the second roller 22 is a follower roller whose location moves so as to impart given tensile force to the tape Ta when the tape Ta is caused to adhere, in a covering manner, to the battery module 16. When the battery module 16 is dropped in an inclined manner, an edge on one side of a bottom surface of the battery module 16 contacts the tape Ta as shown in FIG. 5A. When the battery module 16 is dropped further in arrowed direction 200 in the drawing, the bottom surface of the battery module 16 makes surface-contact with the tape Ta as shown in FIG. 5B, and the edge on one side of the battery module 16 contacts the first roller 20. In FIG. 5B, broken lines designate a reference surface along which the battery module 16 is to be inserted, and the surface inclines at an angle of 5 degrees to 15 degrees or thereabouts with reference to the vertical direction. When the battery module 16 is dropped further in arrowed direction 200 in the drawing, the first roller 20 rotates to thus cause the tape Ta to adhere to the left surface of the battery module 16 as shown in FIG. 5C. Meanwhile, the second roller 22 moves horizontally and vertically in a following manner so as to impart given tensile force to the tape Ta, to thus move from the bottom surface of the battery module 16 to the right surface of the same. Thus, the tape Ta is caused to adhere to the right surface of the battery module 16.

Figure 6A:
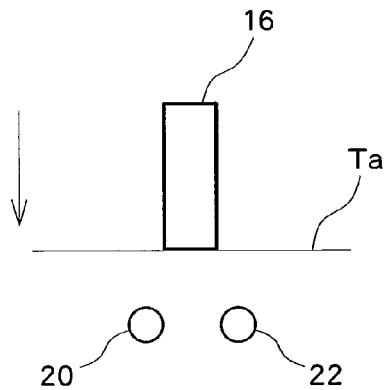
FIG. 6A is a descriptive view pertaining to affixing of a tape to a battery module in the related art (Part 1)
Figure 6B:
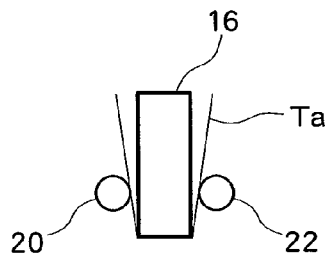
FIG. 6B is a descriptive view pertaining to affixing of the tape to the battery module in the related art (Part 2)
Figure 7:
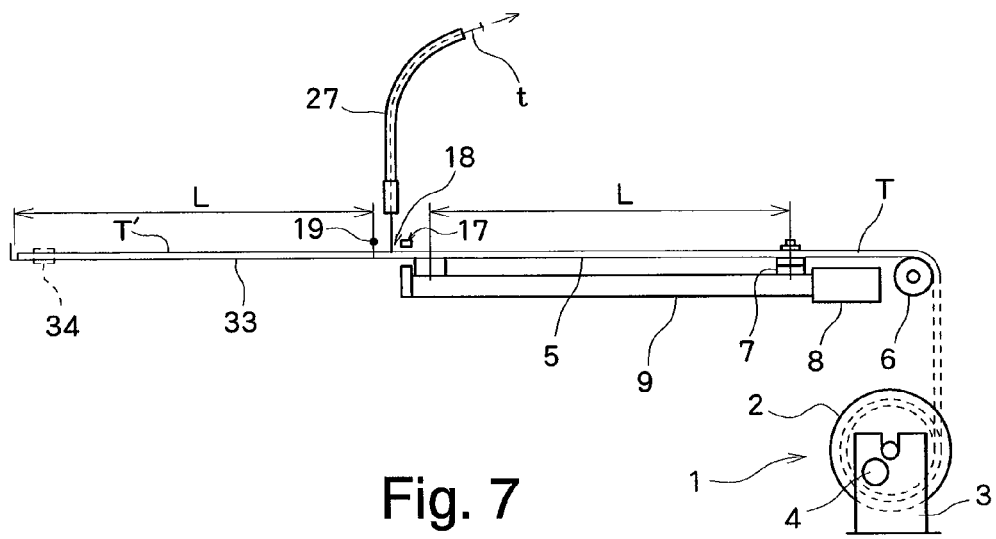
FIG. 7 is a block diagram of a related-art apparatus for supplying a sealing tape of a predetermined length.

FIGS. 6A and 6B show a related-art affixing method involving vertical droppage of the battery module 16. In this case, surface contact occurs between the tape Ta and the bottom surface of the battery module 16, but an affixing position may deviate when displacement has arisen in parallelism between the bottom surface and the tape surface. Moreover, there is a problem of a failure to achieve complete escape of air from the bottom, left, and right surfaces of the battery module 16 being likely to induce accumulation of air bubbles. In contrast, according to the present embodiment, the battery module 16 is dropped in an inclined manner with respect to the tape Ta as shown in FIGS. 5A to 5C. Therefore, the affixing position can be determined with high accuracy by means of specifying the position of the edge on one side of the bottom surface of the battery module 16. Further, adhesion of the bottom surface of the battery module 16 to the tape Ta is sequentially performed from an edge on one side, and therefore air is thoroughly dispelled, to thus prevent generation of air bubbles.

Although the present embodiment has been described by means of taking insulative coating of the battery module 16 as an example, the present invention can also be applied likewise to packaging of another arbitrary product, such as a food product.

What is claimed is:

1. A tape exfoliation apparatus for peeling a removal tape from a removal-tape-attached adhesive tape, comprising:
    a supply section for supplying the removal-tape-attached adhesive tape;
    a carrier plate configured to move from a first position to a second position while holding the removal-tape-attached adhesive tape in a folded manner such that the removal tape comes to the inside and which subsequently moves from the second position to the first position; and
    a holding section positioned underneath the carrier plate when the carrier plate is in the second position, the holding section is configured to hold an adhesive tape side of the removal-tape-attached adhesive tape at the second position, wherein
    the carrier plate is configured to move from the second position to the first position while the removal-tape-attached adhesive tape is being held by the holding section and while the removal tape is folded over an extremity of the carrier plate, thereby peeling the removal tape, and the holding section remains at the second position when the carrier plate is in the first position.

2. The tape exfoliation apparatus according to claim 1, wherein a tapered surface is formed along an edge of the carrier plate which is to contact a folded portion of the removal-tape-attached adhesive tape, and a peeling angle is adjusted by a tapered angle of the tapered surface.

3. The tape exfoliation apparatus according to claim 2, wherein, when moving from the second position to the first position, the carrier plate moves while the edge contacts a surface of the removal-tape-attached adhesive tape at a non-parallel predetermined angle of inclination with respect to an upper surface of the holding section.

4. A tape-affixing apparatus, comprising:
    a supply section for supplying a removal-tape-attached adhesive tape;
    a carrier plate configured to move from a first position to a second position while holding the removal-tape-attached adhesive tape in a folded manner such that the removal tape comes to the inside and which subsequently moves from the second position to the first position; and a holding section positioned underneath the carrier plate when the carrier plate is in the second position, the holding section is configured to hold an adhesive tape side of the removal-tape-attached adhesive tape at the second position, wherein the holding section comprises an upper surface formed from two stages spaced from each other by an amount of predetermined clearance thereby forming a space;

the carrier plate is configured to move from the second position to the first position passing over the space in the holding section when the carrier plate moves from the second position to the first position while the removal-tape-attached adhesive tape is being held by the holding section, thereby peeling the removal tape and holding the adhesive tape in a spanned manner over the predetermined clearance, and the holding section remains at the second position when the carrier plate is in the first position; and the adhesive tape is caused to adhere to a substance subject to adhesion by means of inserting the substance into the space having the predetermined clearance amount from an adhesive surface side of the adhesive tape.

5. The tape-affixing apparatus according to claim 4, wherein the substance subject to adhesion is inserted into the predetermined clearance at a non-parallel predetermined angle of inclination with reference to a vertical direction.

6. The tape-affixing apparatus according to claim 4, wherein the stages constituting the holding section hold the removal-tape-attached adhesive tape by means of subjecting the adhesive tape surface side of the tape to suction.

7. The tape-affixing apparatus according to claim 4, wherein the substance subject to adhesion is a battery module.

8. A tape exfoliation apparatus for peeling a removal tape from a removal-tape-attached adhesive tape, comprising:

an uncoiler for supplying the removal-tape-attached adhesive tape;

a carrier plate configured to move from a first position to a second position while holding the removal-tape-attached adhesive tape in a folded manner such that the removal tape comes to the inside and which subsequently moves from the second position to the first position; and a tape-holding stage positioned underneath the carrier plate when the carrier plate is in the second position, the tape-holding stage is configured to hold an adhesive tape side of the removal-tape-attached adhesive tape at the second position, wherein the carrier plate is moved from the second position to the first position while the removal-tape-attached adhesive tape is being held by the tape-holding stage and while the removal tape is folded over an extremity of the carrier plate, thereby peeling the removal tape, and the tape-holding stage remains at the second position when the carrier plate is in the first position.

9. The tape-affixing apparatus according to claim 8, wherein the carrier plate assumes the shape of a flat plate whose width is equal to or greater than a width of the removal-tape-attached adhesive tape;

an extremity of the carrier plate has a tapered surface; and the removal-tape-attached adhesive tape is retained in a folded manner by means of the tapered surface.

* * * * *